United States Patent
Nagase et al.

(10) Patent No.: US 11,692,931 B2
(45) Date of Patent: Jul. 4, 2023

(54) CONCENTRATION MEASUREMENT DEVICE

(71) Applicant: FUJIKIN INCORPORATED, Osaka (JP)

(72) Inventors: Masaaki Nagase, Osaka (JP);
Kazuteru Tanaka, Osaka (JP);
Masahiko Takimoto, Osaka (JP);
Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 4 days.

(21) Appl. No.: 17/598,636

(22) PCT Filed: Mar. 31, 2020

(86) PCT No.: PCT/JP2020/014744
§ 371 (c)(1),
(2) Date: Sep. 27, 2021

(87) PCT Pub. No.: WO2020/213385
PCT Pub. Date: Oct. 22, 2020

(65) Prior Publication Data
US 2022/0170849 A1 Jun. 2, 2022

(30) Foreign Application Priority Data
Apr. 19, 2019 (JP) ................. 2019-080464

(51) Int. Cl.
*G01N 21/33* (2006.01)
*G01N 21/05* (2006.01)
(Continued)

(52) U.S. Cl.
CPC ............ *G01N 21/33* (2013.01); *G01N 21/05* (2013.01); *G01N 21/27* (2013.01); *G01N 21/59* (2013.01)

(58) Field of Classification Search
CPC ........ G01N 21/33; G01N 21/05; G01N 21/27; G01N 21/59; G01N 21/274; G01N 21/85;
(Continued)

(56) References Cited

U.S. PATENT DOCUMENTS

2007/0191696 A1  8/2007  Mischler et al.
2014/0341506 A1* 11/2014  Brenner ............... G02B 6/4257
385/31
(Continued)

FOREIGN PATENT DOCUMENTS

JP  H07-103895 A     4/1995
JP  H07103895 A  *  4/1995
(Continued)

OTHER PUBLICATIONS

International Search Report issued in PCT/JP2020/014744; dated Jun. 23, 2020.

*Primary Examiner* — Tarifur R Chowdhury
*Assistant Examiner* — Carlos Perez-Guzman
(74) *Attorney, Agent, or Firm* — Studebaker & Brackett PC (57) ABSTRACT

The concentration measurement device 100 includes an electric unit 20 having a light source 22 and a photodetector 24, a fluid unit 10 having a measurement cell 1, optical fibers 11 and 12 for connecting the electric unit 20 and the fluid unit 10 and is configured to measure the concentration of the fluid in the measurement cell by detecting the light incident from the light source 22 to the measurement cell and then emitted from the measurement cell by the photodetector 24, where optical connection parts 32 and 34 connected to the optical fibers 11, 12 and the light source 22 or the photodetector 24 are integrally provided in the electric unit 20.

7 Claims, 7 Drawing Sheets

(51) Int. Cl.
  *G01N 21/27*   (2006.01)
  *G01N 21/59*   (2006.01)

(58) Field of Classification Search
  CPC ......... G01N 21/255; G01N 2021/0314; G01N
      2021/8578; G01N 2201/086; G01N
    2201/1211; G01N 2201/1218; G02B 6/24
  See application file for complete search history.

(56) References Cited

U.S. PATENT DOCUMENTS

| | | | |
|---|---|---|---|
| 2016/0112144 A1* | 4/2016 | Tyrrell | ................. H04B 10/802 |
| | | | 398/117 |
| 2017/0105626 A1 | 4/2017 | Irisawa | |
| 2018/0164212 A1 | 6/2018 | Karki et al. | |
| 2018/0217054 A1 | 8/2018 | Deguchi et al. | |
| 2019/0271636 A1 | 9/2019 | Deguchi et al. | |

FOREIGN PATENT DOCUMENTS

| | | | | |
|---|---|---|---|---|
| JP | 2007-216030 A | | 8/2007 | |
| JP | 2014-219294 A | | 11/2014 | |
| JP | 2015-215196 A | | 12/2015 | |
| JP | 2018-025499 A | | 2/2018 | |
| JP | 2018017644 A | * | 2/2018 | ......... G01N 21/0303 |
| JP | 2018025499 A | * | 2/2018 | |
| JP | 2018-096983 A | | 6/2018 | |
| WO | 2016/002167 A1 | | 1/2016 | |
| WO | 2017/029792 A1 | | 2/2017 | |
| WO | 2018/021311 A1 | | 2/2018 | |

* cited by examiner

CONCENTRATION MEASUREMENT DEVICE

TECHNICAL FIELD

The present invention relates to a concentration measurement device, and more particularly, to a concentration measurement device for measuring a concentration of a fluid based on an intensity of light transmitted through the fluid in a measurement cell.

BACKGROUND OF INVENTION

Conventionally, a concentration measurement device incorporated in a gas supply line for supplying a source gas formed of a liquid material or a solid material, such as an organometal (MO), to a semiconductor manufacturing equipment and configured to measure the concentration of a gas flowing through the gas supply line, so-called in-line type concentration measurement device, is well known.

In this type of concentration measurement device, a light of a predetermined wavelength is made incident from a light source through a light incident window to a measurement cell for flowing a measurement gas, and absorbance is measured by receiving transmitted light passing through the measurement cell by a light receiving element. In addition, the concentration of the measured gas can be obtained from the measured absorbance according to the Lambert-Beer law (for example, Patent Documents 1 to 3).

In the present specification, various transmission light detection structures used for detecting the concentration of a fluid are broadly referred to as measurement cells. The measurement cell includes not only a separately provided measurement cell branched from a fluid supply line, but also an in-line type transmission light detection structure provided in the middle of the fluid supply line as shown in Patent Documents 1 to 3.

PRIOR-ART DOCUMENT

Patent Literature

Patent Document 1: Japanese Laid-Open Patent Publication No. 2014-219294
Patent Document 2: International Publication WO2017/029792
Patent Document 3: International Publication WO 2018/021311

Problems to be Solved by Invention

The in-line type concentration measurement device is composed of a measurement cell incorporated in a fluid supply line and an electric unit arranged apart from the measurement cell. When the measurement cell is heated to a high temperature (e.g., 150° C.), an optical element or circuit element having low high-temperature resistance is preferably installed in an electric unit spaced apart from the measurement cell.

According to the reflection type concentration measurement device described in Patent Document 3, a light source for generating incident light to the measurement cell and a photodetector for receiving light transmitted through the measurement cell are provided in the electric unit separated from the measurement cell. In this device, the light source and the measurement cell are optically connected by an optical fiber and the photodetector and the measurement cell are optically connected by an optical fiber.

Further, in the concentration measurement device of a comparative example by the Applicant, an optical connector such as an FC connector is provided at an end of the optical fiber cable extending from the measurement cell, the optical connector is connected to one side of an adapter attached to the housing for the electric unit (outside of the housing). Further, an optical connector such as FC connector is also provided on the optical fiber cable extending from the light source and the photodetector in the housing. This optical connector is connected to the other side of the adapter (inside of the housing). In the adapter for the FC connector, end faces of ferrules covering the optical fiber and its end portions are butted in split sleeves provided in a through-hole and optically connected at a highly accurate position. The ferrules and the split sleeves are typically made of Zirconia ($ZrO_2$).

FIGS. 7(a) to 7(c) show a connection of a comparative example between a measurement cell and a photodetector by using an FC connector. As shown in FIG. 7(a), the optical fiber cable 91 extending from the photodetector 90 is fixed to the adapter 93 attached to the housing 92 of the electric unit by the FC connector 94. At this time, inside the through-hole of the adapter 93 (more specifically, inside the split sleeve not shown), the end faces of the optical fiber 97a and the ferrule 97b are exposed.

Further, the FC connector 96 is also attached to the end of the optical fiber cable 95 extending from the measurement cell (not shown), the FC connector 96, as shown in FIG. 7(b), is attached to the opposite side of the adapter 93, i.e., outside of the housing 92 of the electric unit. At this time, the optical fiber 98a and the ferrule 98b are inserted into the through-hole of adapter 93. Then, these end faces are butted with the end face of the optical fiber 97a and the ferrule 97b of the optical fiber cable 91 connected to the photodetector 90.

Figure 7:
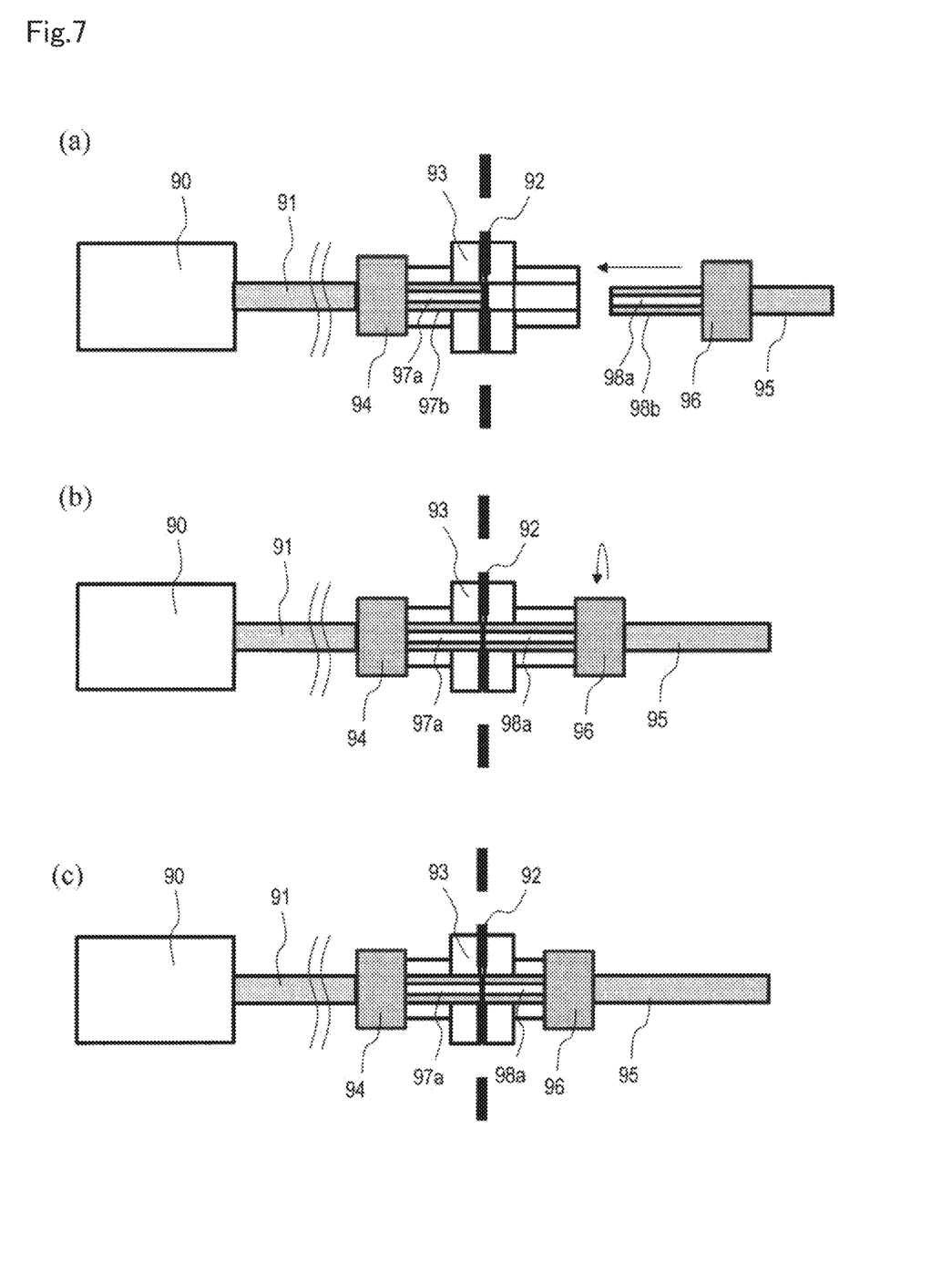
FIG. 7 shows a connection of the optical fiber from the measurement cell to the optical detector of the electric unit in a comparative example, FIG. 7(a) indicates the state before connection, FIG. 7(b) indicates the state immediately before connection, FIG. 7(c) indicates the state after connection.

Furthermore, as shown in FIG. 7 (c), by tightening the coupling nut of the FC connector 96, the end faces of the optical fiber 97a and 98a are pressed and connected to each other in the adapter 93, and the optical fiber cable 95 is firmly fixed to the adapter 93.

However, when connecting the end faces of the optical fiber with each other using the adapter for the optical connector as described above, the occurrence of connection loss and reflection attenuation at the end faces is unavoidable. A technique has been developed for reducing reflection attenuation by polishing the end faces of the optical fiber and the ferrule in a spherical shape and PC (Physical Contact) connecting, which is pressing the end faces to each other or the like, however, in a concentration measurement device, loss of the optical signal generated by the connection between the optical fibers can have a non-negligible effect on the measurement accuracy.

In addition, when performing a reliability test, etc., the electric unit may be detached and the concentration measurement device may be dislocated, so the FC connector may also be in a situation of being extracted and reinserted. Then, when performing extraction and reinsertion of the FC connector, dust or the like may enter between the end faces of the optical fiber, so when reusing the adapter to perform the optical connection, the reflecting component on the end faces of the optical fiber may be increased. Furthermore, the reflection component may also increase by repeating the pressure welding between the end faces of the optical fiber. Therefore, when the optical fibers are connected to each other by using the adaptor, measurement errors of the concentration measurement device may be increased.

In view of the above problems, the main object of the present invention is to provide a concentration measurement device capable of improving measurement accuracy while ensuring convenience.

Means for Solving Problem

The concentration measurement device according to an embodiment of the present invention includes an electric unit having a light source and a photodetector, a fluid unit having a measurement cell, and an optical fiber for connecting the electric unit and the fluid unit. The concentration measurement device is configured to measure a concentration of a fluid in the measurement cell by detecting a light incident from the light source to the measurement cell and then emitted from the measurement cell by the photodetector. In the electric unit, an optical connection part connected to the optical fiber and the light source or the photodetector is integrally provided. In this configuration, it is not necessary to provide an optical fiber between the light connection part and the light source or the photodetector, so that the connection of the end faces between the optical fiber extending from the measurement cell and the optical fiber extending from the optical connection part, the light source or the photodetector can be avoided.

In one embodiment, the electric unit has a housing containing the light source and the photodetector, wherein the optical connection part is provided on an outer surface of the housing, and the light source or the photodetector is provided on an inner surface of the housing adjacent to the optical connection part.

In one embodiment, a first optical fiber for connecting the light source and the measurement cell, and a second optical fiber for connecting the photodetector and the measurement cell are provided, in the electric unit, the first optical fiber is connected to the first optical connection part that is integrally formed with the light source, the second optical fiber is connected to the second optical connection part that is integrally formed with the photodetector.

In one embodiment, both the first optical fiber and the second optical fiber are optical fibers each provided with a FC connector, the FC connector of the first optical fiber is detachably screwed and fixed to a screw on the outer peripheral of a first optical connection part, the FC connector of the second optical fiber is detachably screwed and fixed to a screw on the outer peripheral of a second optical connection part.

In one embodiment, the light source includes a plurality of light-emitting diodes, a half mirror on which light from the plurality of light-emitting diodes is irradiated, and a first condensing means for receiving light from the half mirror. The end face of the first optical fiber connected to the first light connection part faces the first condensing means. The photodetector has a photodiode and a second condensing means provided in front of the photodiode. The end face of the second optical fiber connected to the second light connection part faces the second condensing means.

In one embodiment, the fluid is a gas. A pressure sensor for measuring the pressure of the gas flowing through the measurement cell, a temperature sensor for measuring the temperature of the gas flowing through the measurement cell, and a processing unit connected to the photodetector, the pressure sensor, and the temperature sensor are further provided. Using an extinction coefficient $\alpha_a$ associated with the measurement gas, the processing unit is configured to determine the volume concentration Cv of the measurement gas in the gas mixture based on the following formula, here, $I_0$ is the intensity of the incident light incident to the measurement cell, I is the intensity of the light passing through the measurement cell, R is the gas constant, T is the gas temperature in the measurement cell, L is the optical path length of the measurement cell, Pt is the gas pressure in the measurement cell.

$$Cv = (RT/\alpha_a LPt) \cdot \ln(I_0/I)$$

Effect of Invention

According to the embodiments of the present invention, since the connection, in which the end faces of the optical fibers are in contact with each other to cause measurement errors, is omitted, an optical concentration measurement device capable of performing concentration measurement with improved accuracy is provided.

DETAILED DESCRIPTION OF EMBODIMENTS

Embodiments of the present invention will be described below with reference to the drawings, but the present invention is not limited to the following embodiments. Further, a concentration measurement device, in which the measurement target is a gas, will be described below, but in another embodiment, the measurement target may be a fluid other than a gas, such as a liquid.

Figure 1:
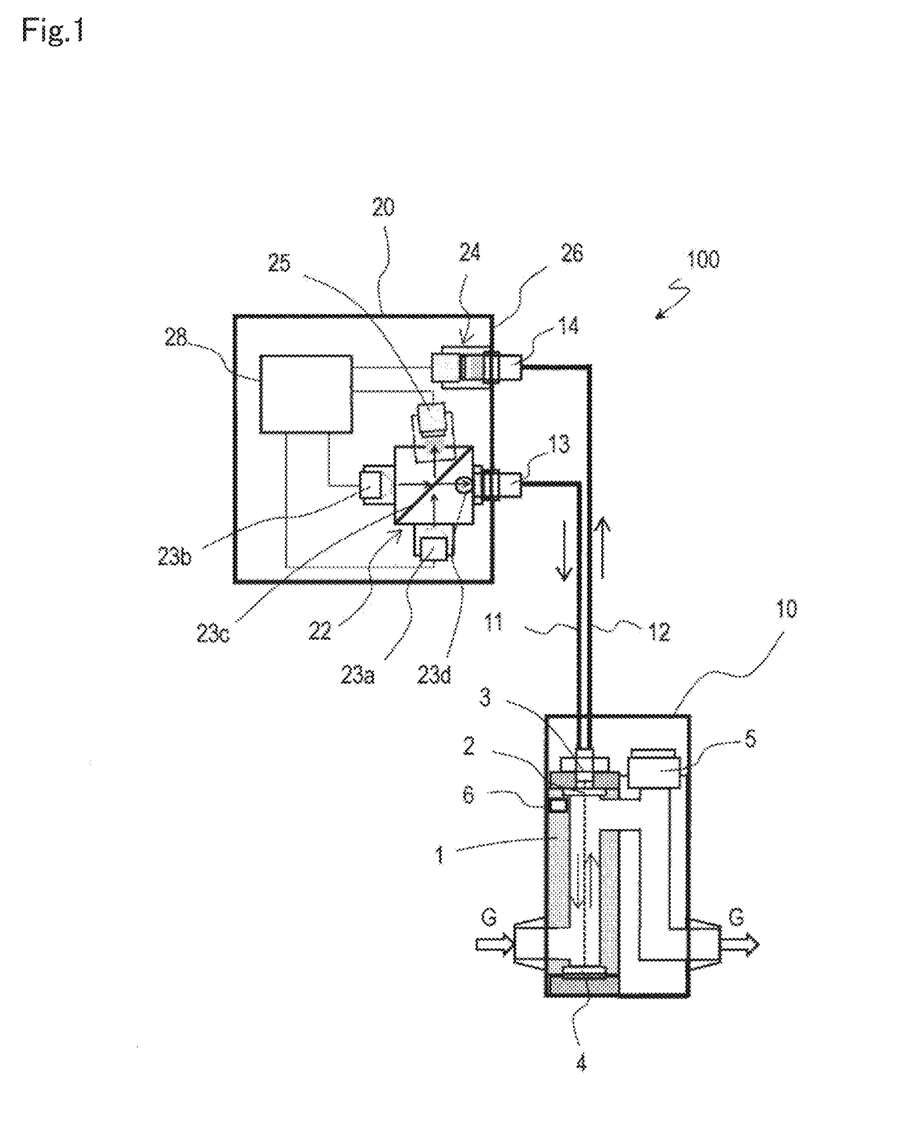
FIG. 1 is a schematic diagram showing an overall configuration of a concentration measurement device according to an embodiment of the present invention.

FIG. 1 is a diagram illustrating the overall configuration of the concentration measurement device 100 used in the embodiments of the present invention. The concentration measurement device 100 includes a fluid unit 10 having a measurement cell 1 incorporated in a gas supply line, and an electric unit 20 provided spaced apart from the fluid unit 10. The fluid unit 10 and the electric unit 20 are optically and electrically connected by an optical fiber cable 11 for incidence including an optical fiber as a core wire (first optical fiber), an optical fiber cable 12 for emitting including an optical fiber as a core wire (second optical fiber), and a sensor cable (not shown).

The fluid unit 10 may be heated to, for example, about 100° C. to 150° C. depending on the type of the measurement gas. However, when a gas at room temperature or below is used, the fluid unit 10 may be used in a state without reaching a high temperature. In addition, the electric unit 20 spaced apart from the fluid unit 10 is normally maintained at room temperature. In the electric unit 20, an external controller may be connected for transmitting an operation control signal to the concentration measurement device 100 or receiving a measurement concentration signal from the concentration measurement device 100.

In the fluid unit 10, a measurement cell 1 having an inlet and an outlet for the measurement gas and a flow path connected to the inlet and outlet extending in the longitudinal direction are provided. At one end of the measurement cell 1, a translucent window portion 2 (here, a translucent plate) in contact with the flow path is provided, at the other end of the measurement cell 1, a reflecting member 4 is provided. Unlike the illustrated embodiment, the inlet may be provided in the vicinity of the window portion 2, the outlet may be provided in the vicinity of the reflecting member 4, and the flow path extending in the longitudinal direction may not extend in a direction perpendicular to the entire flow direction of the gas G. In the present specification, light includes not only visible light but also at least infrared light and ultraviolet light, and it may also include electromagnetic waves of any wavelength. The so-called translucency means that the internal transmittance with respect to the light incident to the measurement cell is sufficiently high to enable performing concentration measurement.

In the vicinity of the window portion 2 of the measurement cell 1, a collimator 3 connected to the two optical fiber cables 11 and 12 is attached. The collimator 3 has a collimator lens, and it is configured to convert light from the light source into parallel light incident on the measurement cell 1, and to receive the reflected light from the reflecting member 4. The reflecting surface of the reflecting member 4 is provided so as to be perpendicular to the traveling direction of the incident light, or the central axis of the flow path. The flow path of the measurement cell 1 is also used as the optical path of the measurement light.

As the window portion 2, a sapphire plate is suitably used, because it is resistant to the detection light used for concentration measurement such as ultraviolet light, has a high transmittance, and is mechanically and chemically stable, but other stable materials such as quartz glass may also be used. The main body (flow path forming portion) of the measurement cell 1 is made of, for example, SUS316L. The reflecting member 4 may be, for example, an aluminum layer or a dielectric multilayer film used as a reflective layer provided on the back surface of the sapphire plate. If a dielectric multilayer film is used as the reflecting layer, it is possible to selectively reflect light of a specific wavelength range (e.g., near ultraviolet rays). The dielectric multilayer film is formed of a laminate of a plurality of optical coatings having different refractive indices (a laminate of high refractive index thin films and low refractive index thin films), by appropriately selecting the thickness and the refractive index of each layer, it is possible to reflect or transmit light of a specific wavelength. Further, since the dielectric multilayer film is possible to reflect light at an arbitrary ratio, a part (e.g., 10%) of it may be made to transmit, and the light transmitted through the reflecting member 4 using a photodetector installed in the lower portion of the reflecting member 4 may be utilized as a reference light.

The fluid unit 10 further includes a pressure sensor 5 for detecting a pressure of the measurement gas flowing through the measurement cell 1, and a temperature sensor 6 for measuring a temperature of the measurement gas. The outputs of the pressure sensor 5 and the temperature sensor 6 are sent to the electric unit 20 via a sensor cable (not shown). The outputs of the pressure sensor 5 and the temperature sensor 6 may be used to measure the gas concentration, as described below.

Further, as the configuration of the fluid unit 10, various modes may be adopted. Although a reflection type fluid unit for reciprocating the measurement light within the cell using a reflection member has been described above, the present invention is not limited to this, and a transmission type fluid unit as described in Patent Document 2, or the like, may also be used. In the transmission type fluid unit, the measurement light is made incident on the incident window provided on one side of the measurement cell, and the transmitted light passing through the cell is emitted from an emitting window provided instead of the reflecting member. The incident light and the transmitted light are transmitted using respective optical fiber cables connected to each end of the measurement cell.

Further, in the concentration measurement device 100 of the present embodiment, the electric unit 20 includes a light source 22 for generating light incident on the measurement cell 1, a photodetector 24 for receiving light emitted from the measurement cell 1, and a processing unit 28 for calculating the concentration of the measurement gas based on a detection signal (detection signal corresponding to the intensity of the received light) output by the photodetector 24. The light source 22, the photodetector 24, and the processing unit 28 are housed in a box-shaped housing 26.

The light source 22 is configured using two light-emitting elements (here LEDs) 23a and 23b emitting ultraviolet light of different wavelengths from each other. Using an oscillation circuit, driving currents of different frequencies flow in the light-emitting elements 23a and 23b. By performing frequency analysis (e.g., Fast Fourier Transform or wavelet transform), it is possible to measure the light intensity corresponding to each wavelength component, according to the detection signal detected by the photodetector 24. As the light-emitting elements 23a and 23b, other than LED, LD (laser diode) may also be used. Further, instead of using the multiplexed light of a plurality of different wavelengths as the light source, it is also possible to use a single wavelength as the light source, in this case, the multiplexer and the frequency analysis circuit can be omitted. Note that the ultraviolet light (e.g., wavelength of 200 nm to 400 nm) is suitably used for measuring the concentration of an organometallic gas such as trimethylgallium.

Both of the light-emitting elements 23a and 23b are arranged so as to irradiate light at an angle of 45°, with respect to the half mirror 23c. Further, a reference photodetector 25 is provided so as to face the light-emitting element 23b across the half mirror 23c. A portion of the light from the light source 22 is incident to the reference photodetector 25 and is used to investigate a degradation or the like of the optical element. The remaining portion of the light is incident on the optical fiber cable 11 for incident light, after being condensed by the ball lens 23d. As the light receiving element of the photodetector 24 and the reference photodetector 25, for example, a photodiode or a phototransistor may be used.

The processing unit 28 is configured by, for example, a processor or a memory provided on a circuit board, includes a computer program for executing a predetermined calculation based on an input signal, and can be realized by a combination of hardware and software. Although the processing unit 28 in the illustrated embodiment is incorporated in the electric unit 20, it is needless to say that a part (CPU, etc.) or all of the components may be provided in a device outside of the electric unit 20.

In the electric unit 20 of the present embodiment, both the light source 22 and the photodetector 24 are provided adjacent to the inner surface of the housing 26 of the electric unit 20. Further, the optical connection part provided integrally with the light source 22 (here, the connection part for the FC connector) is arranged outside through an opening formed in the housing 26, in the same manner, the optical connection part provided integrally with the photodetector 24 (the connection part for the FC connector) is also arranged outside through an opening formed in the housing 26.

The "integrally" described above means a state where the optical connection part and the light source 22 (or the photodetector 24) are adjacent and fixed to each other. It is not limited to a non-detachably interconnected state but may be a detachably interconnected state by screwing or the like. Further, a thin plate member, such as the housing 26, may be sandwiched in between the interface of the light connection part and the light source 22 (or the photodetector 24).

Then, the optical connector (here FC connector 13) provided at the end of the optical fiber cable 11 for incident light extending from the measurement cell 1 of the fluid unit 10 is connected to the optical connection part provided integrally with the light source 22. In the same manner, the optical connector (FC connector 14) provided at the end of the optical fiber cable 12 for emitting light extending from the measurement cell 1 is connected to the optical connection part provided integrally with the photodetector 24. Hereinafter, the details of the electric unit 20 will be described.

Figure 2:
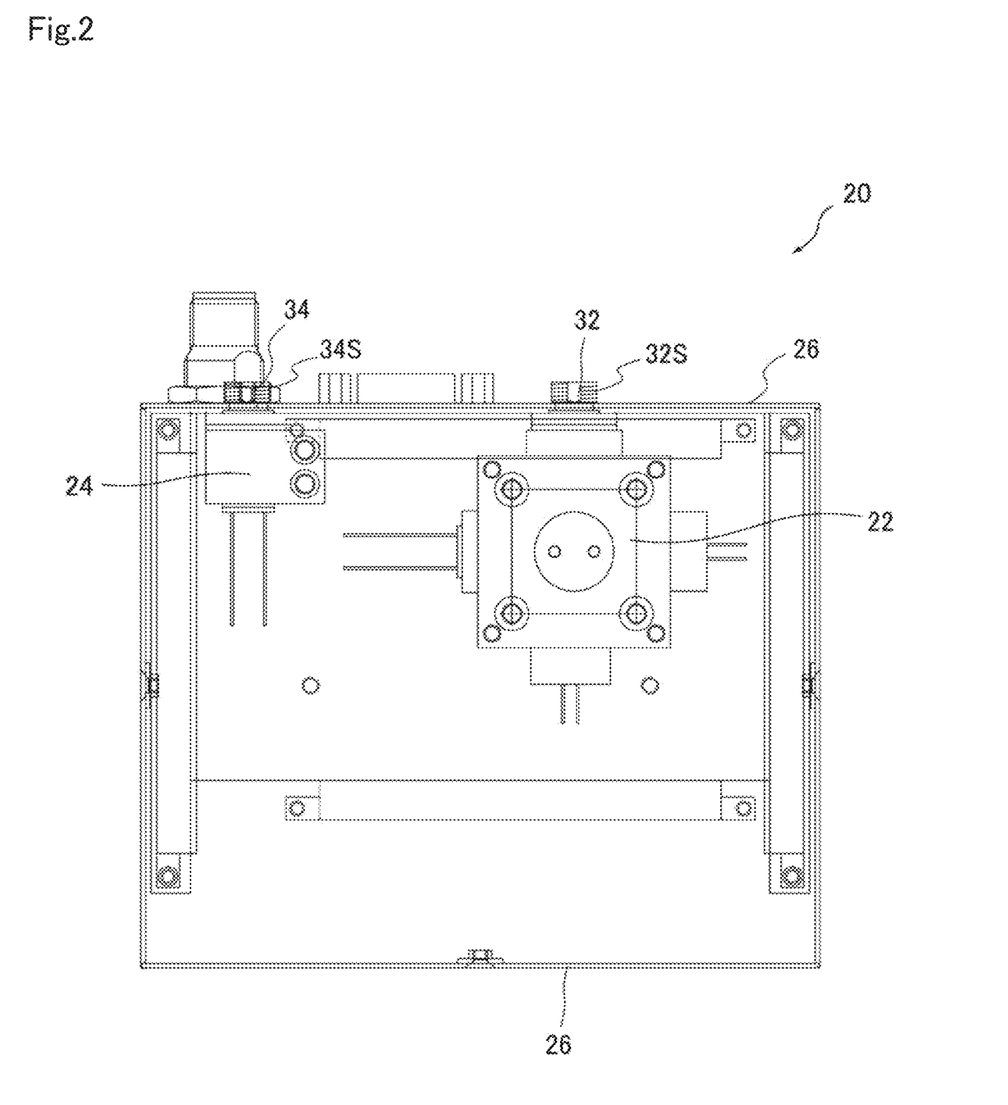
FIG. 2 is a plan view showing the inside of an electric unit including the concentration measurement device according to an embodiment of the present invention.

FIG. 2 is a plan view showing the inside of the electric unit 20. Further, FIG. 3(*a*) is a side view when viewed the electric unit 20 from the left direction, FIG. 3(*b*) is a side view when viewed from the right direction, and FIG. 3(*c*) is a side view when viewed from the lower direction. Note that, the FIG. 2 shows a state where the electric unit 20 shown in FIG. 1 is rotated 90° left. On the upper side in the drawing, the optical connection part for the optical fiber cables 11 and 12 extending from the measurement cell 1 shown in FIG. 1 (more specifically, FC connectors 13 and 14) is located.

Figure 3:
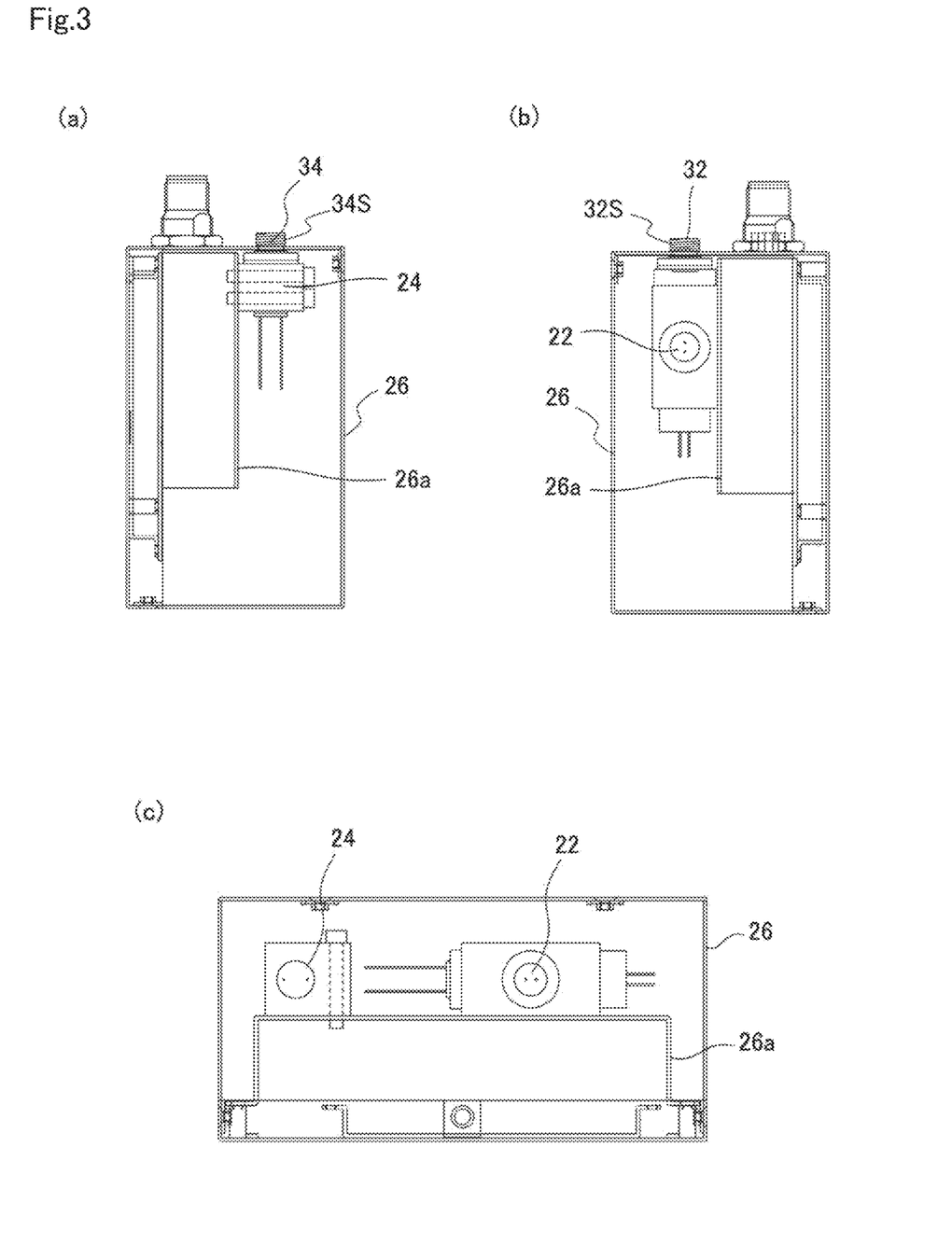
FIG. 3(a) is a side view when viewed from the left direction of FIG. 2.
FIG. 3(b) is a side view when viewed from the right direction of FIG. 2.
FIG. 3(c) is a side view when viewed from the lower direction of FIG. 2.

As can be seen from FIGS. 2 and 3(*a*) to 3(*c*), in the electric unit 20, the optical connection part 32 to be connected with the FC connector 13 (first light connection part) and the light source 22 is integrally provided. The optical connection part 32 is disposed on the outer surface of the housing 26, the light source 22 is disposed adjacent to the optical connection part 32 on the inner surface of the housing 26. In the present embodiment, the light connection part 32 and the light source 22 are firmly interconnected and the optical connection part 32 is disposed outside of the housing 26 through an opening 42 (see, FIG. 5) formed in the housing 26. Further, an outer peripheral screw 32S is provided on the optical connection part 32. By screwing the coupling nut of the FC connector 13, the optical fiber cable 11 is firmly fixed to the optical connection part 32.

In the same manner, the optical connection part 34 to be connected with the FC connector 14 (second optical connection part) and the photodetector 24 are provided integrally. The optical connection part 34 is disposed on the outer surface of the housing 26, and the photodetector 24 is disposed adjacent to the optical connection part 34 on the inner surface of the housing 26. In the present embodiment, the optical connection part 34 and the photodetector 24 are firmly interconnected, the optical connection part 34 is disposed outside the housing 26 through the opening 44 (see, FIG. 5) formed in the housing 26. Further, an outer peripheral screw 34S is provided in the optical connection part 34. By screwing the coupling nut of the FC connector 14, the optical fiber cable 12 is rigidly fixed to the optical connection part 34.

As shown in FIG. 3(*a*) to 3(*c*), in the present embodiment, the light source 22 and the photodetector 24 are disposed on the base 26a and adjacent to the front plate of the housing 26. The space below the base 26a may accommodate circuit board (not shown) and the processing unit 28 shown in FIG. 1 may be provided to the circuit board.

As is clear from the above description, in the electric unit 20, the FC connector 13 and the light source 22 are directly connected, and there is no optical fiber between the light connection part 32 and the light source 22. Further, the FC connector 14 and the photodetector 24 are directly connected, and there is no optical fiber between the optical connection part 34 and the photodetector 24. Thus, in the present embodiment, rather than connecting the end faces of the optical fibers to each other using an adapter as in the comparative example shown in FIG. 7, the end faces of the optical fiber are connected so as to face the optical elements of the light source 22 and the photodetector 24 having the optical connection part 32 and the optical connection part 34.

Figure 4:
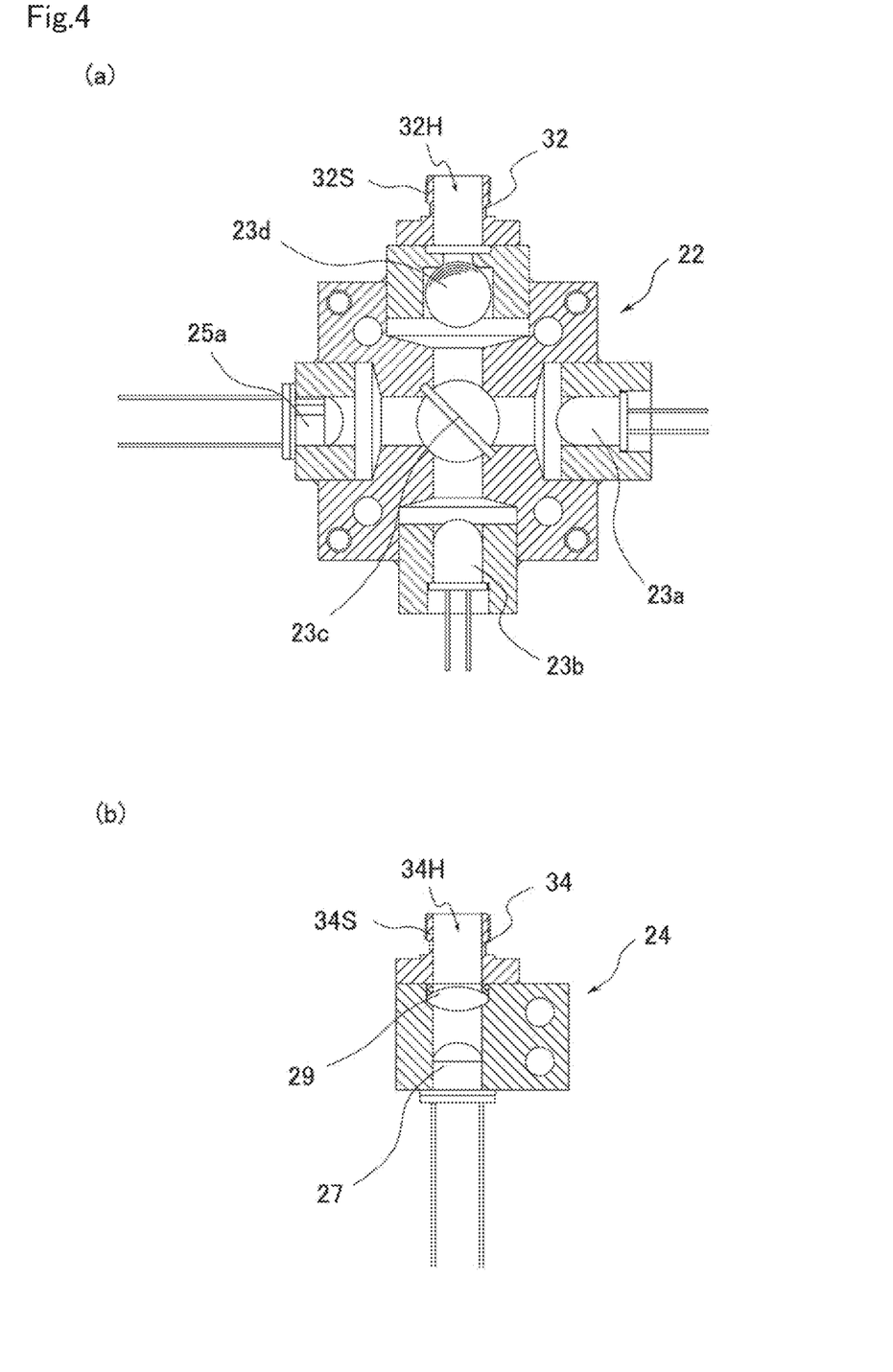
FIG. 4(a) is a longitudinal sectional view showing a light source with an optical connection part provided in the electric unit.
FIG. 4(b) is a longitudinal sectional view showing a photodetector with an optical connection part provided in the electric unit.

FIG. 4(*a*) shows a cross-sectional view of the light source 22. As shown in FIG. 4(*a*), the light-emitting elements 23a and 23b, the half mirror 23c, the ball lens 23d, and the photodiode 25a constituting the reference photodetector are provided in the light source 22. The ball lens 23d may be other condensing means (first condensing means) such as a plano-convex lens. The light-emitting elements 23a and 23b, and the wiring extending from the back of the photodiode 25a are connected to the processing unit 28 (see, FIG. 1). Further, in the optical connection part 32, a through hole 32H extending toward the half mirror 23c is provided. The distal end portion of the FC connector 13 is inserted in the through-hole 32H. In the present embodiment, the light source 22 includes a WDM type of multiplexer and is configured by attaching each element to the metallic block made of SUS316 or SUS304 having holes for optical paths formed therein.

In this configuration, the end face of the optical fiber faces the ball lens 23d, and the light from the half mirror 23c is condensed by the ball lens 23d and incident on the end face of the optical fiber exposed at the distal end of the FC connector 13. Note that, in the FC connector 13, the tip of the optical fiber may be covered with a ferrule made of zirconia or the like as same as the normal connector.

FIG. 4(*b*) shows a cross-sectional view of the photodetector 24. As shown in FIG. 4(*b*), a photodiode 27 and a biconvex lens 29 arranged in front of the photodiode 27 are provided in the photodetector 24. The biconvex lens 29 may be other condensing means (second condensing means), such as a plano-convex lens. The wiring extending from the back of the photodiode 27 is connected to the processing unit 28 (see, FIG. 1). Further, a through hole 34H extending toward the biconvex lens 29 is provided in the optical connection part 34, and the distal end of the FC connector 14 is inserted in the through hole 34H. The photodetector 24 is also configured by attaching each element to the metallic block made of SUS316 or SUS304 having holes for optical paths formed therein.

In this configuration, the end face of the optical fiber faces the biconvex lens 29, the light transmitted from the measurement cell 1 via the optical fiber cable 12 is emitted toward the biconvex lens 29 from the end face of the optical fiber exposed at the distal end portion of the FC connector 14. Note that, in the FC connector 13, the tip of the optical fiber may be covered by a ferrule made of zirconia or the like as same as the normal FC connector.

In the above configuration, the end face of the optical fiber is facing the light source 22 or the optical element (in this embodiment, the ball lens 23d and the biconvex lens 29) provided in the photodetector 24. In order to improve the measurement accuracy, the optical system is preferably arranged so that the radiation intensity of the measurement light becomes the maximum. For this reason, based on the output of the photodetector 24, the posture of the light source 22 and the photodetector 24 can be finely adjusted by the three axes of X-axis. Y-axis, and Z-axis. The posture may be fixed at where the output of the photodetector 24 becomes the maximum.

Figure 5:
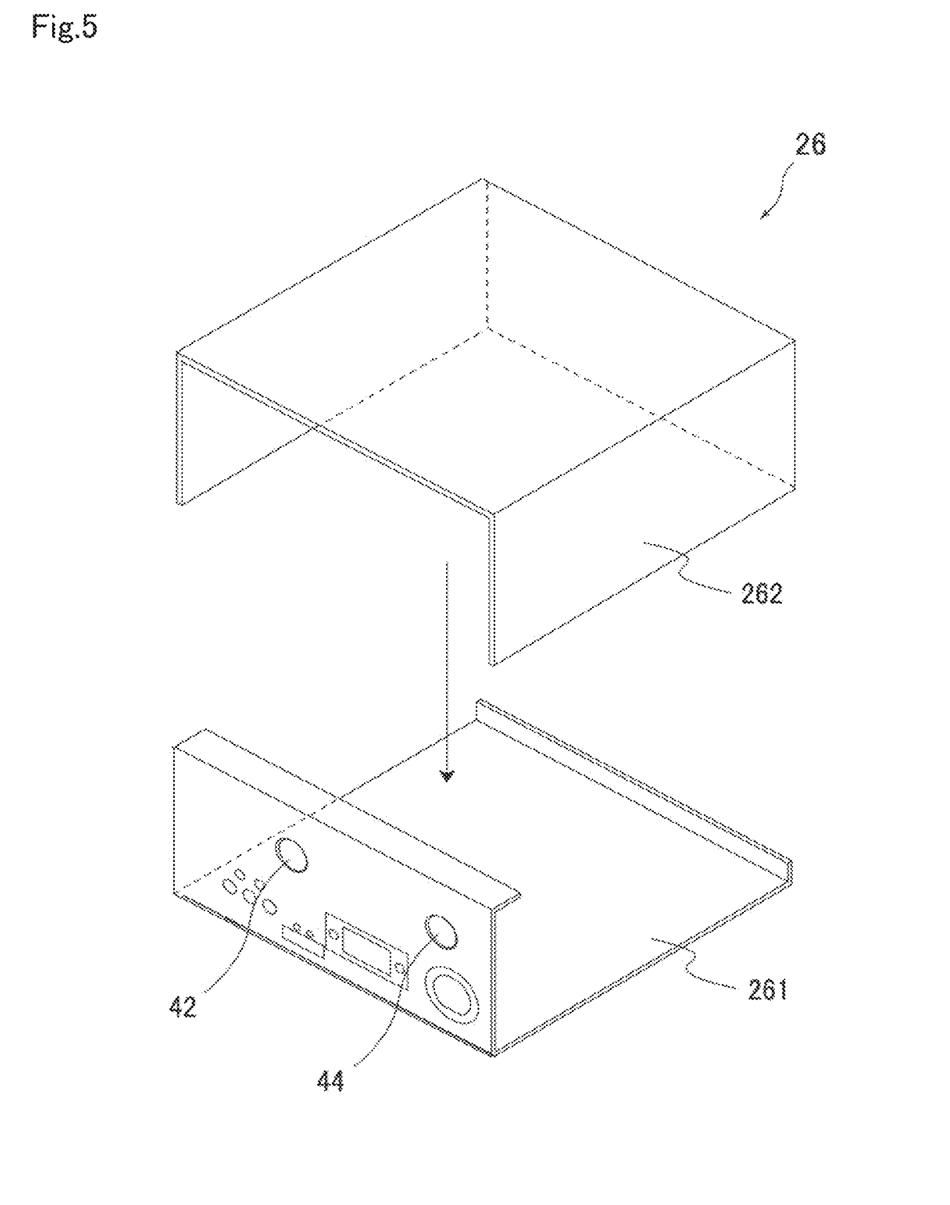
FIG. 5 is an exploded perspective view showing a housing provided in the electric unit.

FIG. 5 is a diagram showing a configuration of the housing 26 of the electric unit 20. The housing 26 of the present embodiment includes a first member 261 of substantially L-shaped cross-section having front and bottom surfaces, and a second member 262 having both sides, top and rear surfaces. The combination of the first member 261 and the second member 262 forms a box-shaped housing to provide an accommodating space therein. The first member 261 and the second member 262 are fixed to each other by screws or the like provided at respective places. When forming the electric unit 20, the light source 22 and the photodetector 24 or the like may be fixed to a stand provided on the bottom surface of the first member 261, then the second member 262 may be fixed to the first member 261 by covering as a cover.

On the front surface of the first member 261, an opening 42 for outputting the light connection part 32 of the light source 22 to the outside and an opening 44 for outputting the light connection part 34 of the photodetector 24 to the outside are provided. Thus, the optical connection part 32 and the optical connection part 34 can be easily disposed outside the housing 26, and the FC connectors 13 and 14 can be easily connected.

In the concentration measurement device 100 of the present embodiment described above, since the end faces of the optical fiber cables 11 and 12 are connected so as to face the optical element of the light source 22 and the photodetector 24, it is possible to suppress the occurrence of stray light without connecting the optical fiber end faces. Further, since the optical fiber cables 11 and 12 are detachably screwed and fixed to the light source 22 and the photodetector 24 using FC connectors 13 and 14, they can be removed when necessary to separate the electric unit 20. Therefore, the reliability test of the electric unit 20 can be easily performed. Moreover, even when reconnected, it does not cause damaged parts by connecting the end faces of the optical fibers, also, since dust penetration between the end faces does not occur, it is possible to prevent the occurrence of measurement errors caused by dust.

Figure 6:
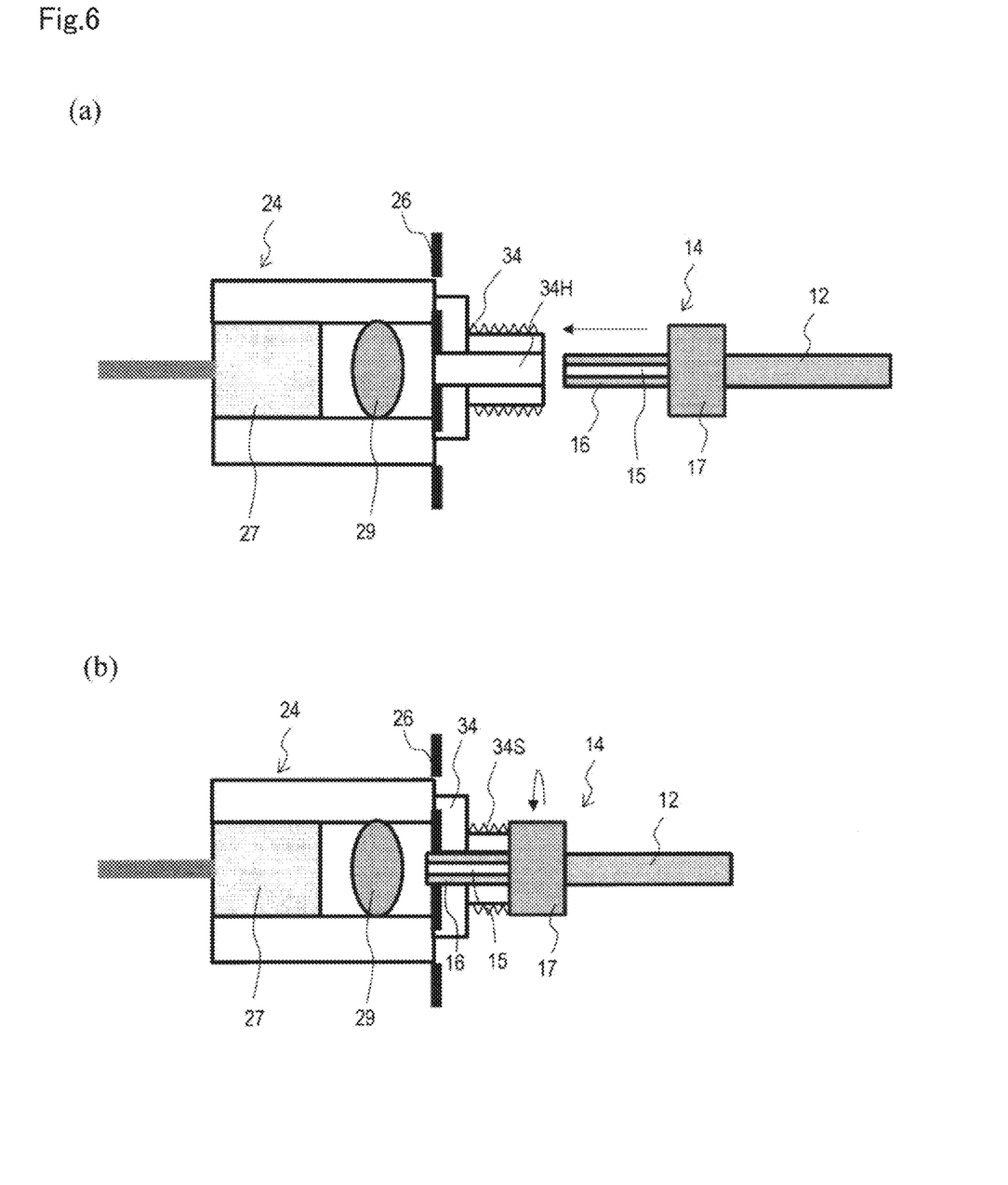
FIG. 6 shows a state of connecting the optical fiber from a measurement cell to the photodetector provided with the electric unit according to an embodiment of the present invention, FIG. 6(a) indicates the state before connection, and FIG. 6(b) indicates the state after connection.

FIGS. 6(a) and 6(b), are diagrams showing an aspect of connecting the optical fiber cable 12 to the optical connection part 34 of the photodetector 24. Also, the aspect of connecting the optical fiber cable 11 to the optical connection part 32 of the light source 22 is the same.

As shown in FIG. 6(a), the optical connection part 34 of the photodetector 24 is disposed outside the housing 26, the through hole 34H provided in the optical connection part 34 leads to the biconvex lens 29 in front of the photodiode 27. Then, the distal end portion of the optical fiber cable 12 provided with the FC connector 14 is inserted into the through-hole 34H of the optical connection part 34. At the tip of the FC connector 14, the optical fiber 15 and the covering ferrule 16 extend in a rod shape. Further, the coupling nut 17 has a screw on the inside and is rotatable about the optical fiber cable 12.

Next, as shown in FIG. 6(b), the optical fiber 15 and the ferrule 16 pass through the through-hole of the optical connection part 34 and is inserted to a position facing the biconvex lens 29. Further, by tightening the coupling nut 17 to the outer peripheral screw 34S, the optical fiber cable 12 is rigidly fixed to the photodetector 24.

Hereinafter, a concentration measurement method in the concentration measurement device 100 will be described. In the measurement cell 1, the optical path length L of the light reciprocating in the measurement cell 1 can be defined by twice the distance between the window portion 2 and the reflecting member 4. In the concentration measurement device 100, the light of wavelength λ reflected by the reflecting member 4 after being incident on the measurement cell 1 is absorbed depending on the concentration of the gas. Then, the processing unit 28 can measure the absorbance Aλ at the wavelength λ by analyzing the frequency of the detection signal from the photodetector 24 and further calculate the molar concentration CM from the absorbance Aλ based on the Lambert-Beer law shown in the following equation (1):

$$A\lambda = -\log_{10}(I/I_0) = \alpha' L C_M \tag{1}$$

In the above equation (1), $I_0$ is the intensity of the incident light incident on the measurement cell, I is the intensity of the light passing through the gas in the measurement cell, α' is the molar extinction coefficient (m²/mol), L is the optical path length (m) of the measurement cell, and $C_M$ is the molar concentration (mol/m³). The molar extinction coefficient α' is a coefficient determined by substance. $I/I_0$ is general referred to as transmission, which has an absorptance Aλ of 0 when the transmission $I/I_0$ is 100%, and an absorptance Aλ of infinity when the transmission $I/I_0$ is 0%. In addition, regarding the intensity of the incident light $I_0$ in the above equation, when there is no absorbing gas in the measurement cell 1 (e.g., when a gas that does not absorb ultraviolet light is filled, or when it is vacuumed), the intensity of the light detected by the photodetector 24 may be regarded as the intensity of the incident light $I_0$.

The concentration measurement device 100 may be configured so as to determine the concentration of the gas in consideration of the pressure and temperature of the gas flowing through the measurement cell 1. Specific embodiment will be described below. The above Lambert-Beer equation (1) holds, but it may be expressed as $C_M = n/V$ because the above molar concentration $C_M$ is the mass of the gas per unit volume. Here, n is the amount of substance (mol) of the gas, i.e. the number of moles, and V is the volume (m³) of the gas. Then, since the object to be measured is a gas, the molarity $C_M = n/V = P/RT$ is derived from the equation PV=nRT according to the ideal gas law. When this is substituted into the Lambert-Beer equation and $-\ln(I/I_0) = \ln(I_0/I)$ is applied, the following equation (2) can be obtained:

$$\ln(I_0/I) = \alpha L (P/RT) \tag{2}$$

In the equation (2), R is the gas constant=0.0623 (Torr·m$^3$/K/mol), P is the pressure (Torr), and T is the temperature (K). The molar extinction coefficient α in the Equation (2) is the molar extinction coefficient with for the natural logarithm of transmittance where α satisfies the relationship α'=0.434α with respect to α' in the Equation (1).

Here, the pressure that can be detected by the pressure sensor is the total pressure Pt (Torr) of the mixed gas containing the measurement gas and the carrier gas. On the other hand, gas related to absorption is only the measurement gas, and the pressure P in the above equation (2) corresponds to the partial pressure Pa of the measurement gas. Therefore, when the partial pressure Pa of the measurement gas is expressed by the equation (2) using the equation Pa=Pt·Cv, which is an equation expressed by the concentration Cv (volume %) of the measurement gas in the entire gas and the total pressure Pt, the relationship between the concentration (volume %) of the measurement gas in consideration of the pressure and temperature and the absorbance can be expressed by the following equation (3) using the extinction coefficient $α_a$ of the measurement gas.

$$ln(I_0/I)=α_aL(Pt·Cv/RT) \quad (3)$$

Further, when transforming the equation 3, the following equation (4) can be obtained.

$$Cv=(RT/α_aLPt)·ln(I_0/I) \quad (4)$$

Therefore, according to the equation (4), it is possible to calculate the measured gas concentration (volume %) at the wavelength of the measurement light based on the measured values (the gas temperature T, the total pressure Pt, and the intensity I of the transmitted light). In this manner, the concentration of the extinction coefficient gas in the mixed gas can be obtained in consideration of the gas temperature and the gas pressure. Note that the extinction coefficient $α_a$ of the measurement gas can be determined in advance according to the equation (3) or (4) from the measured values (T, Pt, I) when a measurement gas having a known concentration (e.g., 100% concentration) is flowed. The extinction coefficient as obtained in this manner is stored in the memory, and the extinction coefficient as can be read out from the memory and used for performing concentration calculation of the measurement gas of unknown concentration based on the equation (4).

While the concentration measurement device according to the embodiment of the present invention has been described above, the present invention is not limited to the above embodiment, and various modification may be made without departing from the spirit of the present invention. For example, as the measurement light, a light in a wavelength region other than the ultraviolet region, such as visible light or near-infrared light, may be used depending on the type of gas.

In the above description, an embodiment wherein both the light source 22 and the photodetector 24 provided with integral optical connection parts has been described, it may be configured by only one of them. Furthermore, in the reflection type concentration measurement device, even when connecting the incident light and the emitted light by a single common optical fiber cable, an integral optical connection part is provided in the demultiplexing module to which a photodetector is attached. The integral optical connection part may be disposed outside of the electric unit. Also in this case, the demultiplexing module and the optical fiber between the optical detector and the optical connection part may be omitted, so that the occurrence of stray light due to the connection between the end faces of the optical fibers can be suppressed. Furthermore, the optical fiber from the measurement cell may be one that connects a connector other than the FC connector to the corresponding optical connection part.

INDUSTRIAL APPLICABILITY

The concentration measurement device according to the embodiment of the present invention is used for semiconductor manufacturing equipment or the like and is suitably utilized for measuring concentration of various fluids.

DESCRIPTION OF NUMERALS

1 Measurement cell
2 Window portion
3 Collimator
4 Reflecting member
5 Pressure sensor
6 Temperature sensor
10 Fluid unit
11 Optical fiber cable (for incidence)
12 Optical fiber cable (for emission)
13, 14 FC connector
15 Optical fiber
20 Electric unit
22 Light source
24 Photodetector
25 Reference photodetector
26 Housing
28 Processing units
32, 34 Optical connection parts
100 Concentration measurement device

What is claimed is:

1. A concentration measurement device comprising:
an electric unit having a light source unit and a photodetector;
a fluid unit having a measurement cell; and
optical fibers connecting the electric unit and the fluid unit,
the concentration measurement device being configured to measure a concentration of a fluid in the measurement cell by detecting with the photodetector a light incident on the measurement cell from the light source and emitted from the measurement cell,
wherein the electric unit comprises a housing for accommodating the light source unit and the photodetector,
a first optical connection part integrally formed with the light source unit and a second optical connection part integrally formed with the photodetector are disposed on an outer surface of the housing, and
the light source unit is disposed on an inner surface of the housing adjacent to the first optical connection part and the photodetector is disposed on an inner surface of the housing adjacent to the second optical connection part.

2. The concentration measurement device according to claim 1 comprising a first optical fiber for connecting the light source unit and the measurement cell and a second optical fiber for connecting the photodetector and the measurement cell, the first optical fiber being connected to the first optical connection part and the second optical fiber being connected to the second optical connection part.

3. The concentration measurement device according to claim 2, wherein both the first optical fiber and the second optical fiber are each provided with an optical fiber FC connector, the FC connector of the first optical fiber is detachably screwed and fixed to an outer peripheral screw of the first optical connection part, and the FC connector of the second optical fiber is detachably screwed and fixed to an outer peripheral screw of the second optical connection part.

4. The concentration measurement device according to claim 2, wherein the light source unit includes a plurality of light-emitting diodes; a half mirror irradiated with the light from the plurality of light-emitting diodes; and a first condensing lens for receiving light from the half mirror, an end face of the first optical fiber connected to the first light connection part facing the first condensing lens, and the photodetector has a photodiode and a second light condensing lens disposed in front of the photodiode, an end surface of the second optical fiber connected to the second optical connection part facing the second light condensing lens.

5. The concentration measurement device according to claim 1, further comprising:
- a pressure sensor for detecting the pressure of the gas flowing through the measurement cell;
- a temperature sensor for measuring the temperature of the gas flowing through the measurement cell; and
- a processing unit connected to the photodetector, the pressure sensor, and the temperature sensor,
- wherein the fluid is a gas, and
- the processing unit is configured to determine a volume concentration Cv of the measurement gas in a mixed gas based on the following equation using an extinction coefficient aa associated with the measurement gas:

$$Cv = (RT/\alpha_a LPt) \cdot \ln(I_0/I)$$

where $I_0$ is an intensity of an incident light on the measurement cell, I is an intensity of light passing through the measurement cell, R is a gas constant, T is a temperature of the gas in the measurement cell, L is an optical path length of the measurement cell, and Pt is a pressure of the gas in the measurement cell.

6. The concentration measurement device according to claim 1, wherein
- the light source unit comprises a first light emitting element, a second light emitting element, a half mirror receiving light from the first light emitting element and the second light emitting element, a reference light detector and a holder having optical passes inside,
- the first light emitting element and the reference light detector are arranged on the holder to face each other, sandwiching the half mirror, and
- the second light emitting element is arranged on the holder to face the first optical connection part sandwiching the half mirror.

7. The concentration measurement device according to claim 1 further comprising a three-axis adjustor for adjusting a posture of the light source unit and the photodetector.

* * * * *